(12) United States Patent  
Henderer et al.

(10) Patent No.: US 7,665,934 B2
(45) Date of Patent: Feb. 23, 2010

(54) CUTTING TAP AND METHOD OF MAKING A CUTTING TAP

(75) Inventors: Willard E. Henderer, Evans, GA (US); Vladimir Volokh, Maalot (IL); Sadayuki Akaki, Fukushima (JP)

(73) Assignees: Kennametal Inc., Latrobe, PA (US); Yamawa Manufacturing Ltd, Tokyo (JP)

( * ) Notice: Subject to any disclaimer, the term of this patent is extended or adjusted under 35 U.S.C. 154(b) by 153 days.

(21) Appl. No.: 11/582,805

(22) Filed: Oct. 18, 2006

(65) Prior Publication Data

US 2008/0095587 A1   Apr. 24, 2008

(51) Int. Cl.
*B23B 51/00* (2006.01)

(52) U.S. Cl. .......... 408/222; 408/219; 470/198
(58) Field of Classification Search .......... 408/215, 408/222, 216, 219, 220; 470/198; *B23B 51/00*
See application file for complete search history.

(56) References Cited

U.S. PATENT DOCUMENTS

| | | | | |
|---|---|---|---|---|
| 2,202,236 | A * | 5/1940 | Stimson | 408/222 |
| 4,708,542 | A | 11/1987 | Emanuelli | |
| 5,049,009 | A | 9/1991 | Beck et al. | |
| 5,222,847 | A * | 6/1993 | Hiyama et al. | 408/222 |
| 5,318,393 | A | 6/1994 | Yamada | |
| 5,487,626 | A | 1/1996 | Von Holst et al. | |
| 6,213,693 | B1 * | 4/2001 | Kato | 408/222 |
| 6,217,267 | B1 * | 4/2001 | Sugano et al. | 408/222 |
| 6,345,941 | B1 * | 2/2002 | Fang et al. | 409/74 |
| 6,602,029 | B1 | 8/2003 | George | |
| 6,840,718 | B2 | 1/2005 | Newmark | |
| 7,001,113 | B2 | 2/2006 | Flynn et al. | |
| 7,144,208 | B2 * | 12/2006 | Henderer et al. | 408/144 |
| 7,553,114 | B2 * | 6/2009 | Oknestam et al. | 408/222 |
| 2001/0018011 | A1 | 8/2001 | Volokh | |
| 2003/0118411 | A1 | 6/2003 | Flynn et al. | |

(Continued)

FOREIGN PATENT DOCUMENTS

EP      0 122 176 B1    3/1984

(Continued)

OTHER PUBLICATIONS

Oberg, Erik et al., Machinery's Handbook 24th Edition, A Reference Book for the Mechanical Engineer, Designer, Manufacturing Engineer . . . p. 1696.

(Continued)

*Primary Examiner*—Eric A Gates
(74) *Attorney, Agent, or Firm*—Matthew W. Smith (57) ABSTRACT

A cutting tap that has an elongate tap body with a fluted section at the axial forward end thereof wherein the fluted section includes a chamfered fluted section and a finishing fluted section. Each cutting thread in the chamfered fluted section has a cutting face disposed at a cutting face angle that becomes more negative the more axially rearward the cutting thread is from the axial forward end of the chamfered fluted section. Each cutting thread in the finishing fluted section has a cutting face disposed at a finishing cutting face angle that is essentially equal. The finishing cutting face angle is more negative than the cutting face angle for the cutting thread at the axial rearward termination of the chamfered fluted section.

12 Claims, 7 Drawing Sheets

U.S. PATENT DOCUMENTS

| | | | |
|---|---|---|---|
| 2003/0138302 A1 | 7/2003 | Newmark | |
| 2004/0105730 A1 | 6/2004 | Nakajima | |
| 2004/0170482 A1* | 9/2004 | Henderer et al. | 408/222 |
| 2004/0247406 A1 | 12/2004 | Malagino et al. | |
| 2005/0042049 A1 | 2/2005 | Schwarz | |
| 2007/0298280 A1* | 12/2007 | Omori et al. | 428/698 |
| 2008/0069653 A1* | 3/2008 | Glimpel et al. | 408/193 |

FOREIGN PATENT DOCUMENTS

| | | |
|---|---|---|
| EP | 0 532 802 A1 | 3/1993 |
| EP | 1 442 814 A1 | 8/2004 |
| EP | 0 953 396 B1 | 4/2005 |
| FR | 1190274 | 10/1959 |
| GB | 700843 | 12/1953 |
| JP | 53058894 A | 5/1978 |
| JP | 54105381 A2 | 8/1979 |
| JP | 61214909 A | 9/1986 |
| JP | 62004515 A2 | 1/1987 |
| JP | 01171725 A | 7/1989 |
| JP | 01289615 A2 | 11/1989 |
| JP | 2-198707 (A) | 8/1990 |
| JP | 02198707 A | 8/1990 |
| JP | 03149127 A2 | 6/1991 |
| JP | 04075816 A | 3/1992 |
| JP | 06179121 A | 6/1994 |
| JP | 07195224 A | 8/1995 |
| JP | 2004148430 A2 | 5/2004 |
| WO | WO 02/28578 A3 | 4/2002 |
| WO | WO 02/087813 A1 | 11/2002 |
| WO | WO 2004/076108 A2 | 9/2004 |
| WO | WO 2005/120786 A2 | 12/2005 |
| WO | WO 2006067956 A1 * | 6/2006 |

OTHER PUBLICATIONS

ASTM A 600 92a (2004) "Standard Specification for Tool Steel High Speed" 14 pgs.

* cited by examiner

PRIOR ART

FIG. 6

CUTTING TAP AND METHOD OF MAKING A CUTTING TAP

BACKGROUND OF THE INVENTION

The invention pertains to a cutting tap that is used to cut internal screw threads in a material. More specifically, the invention pertains to a cutting tap that is used to cut internal screw threads in a material wherein the cutting tap exhibits a cutting edge geometry that makes it suitable to be made from cemented carbide (e.g., cobalt cemented tungsten carbide) tool materials.

Mechanisms and machine components requiring screw threads have had a long history in many technologies. In this regard, the use of screw threads as a fastener component has consistently dominated over all other means to join component parts into assemblies. Thus, it can be appreciated that articles used to form screw threads are essential to many manufacturing technologies.

Although there are many ways to generate internal screw threads, as well as external screw threads, experience has shown that cutting taps are the favored way to generate an internal screw thread. There currently exist two tapping methods to generate internal screw threads. The dominant one of the tapping methods comprises cutting material from the wall of a hole and then removing the same to produce a helical V-shaped screw thread. In the alternative, material can be displaced to form an internal screw thread. The first method of tapping by cutting material is generally favored over the second method since the method of tapping by cutting requires lower torque and produces a more precise thread form than does the displacement method.

As can be appreciated, the dimensional accuracy of the shape and size of the internal screw thread controls the precision and fit of the screw thread assembly. In other words, the ability to form an internal screw thread that exhibits improved dimensional accuracy with respect to the shape and size of the threads results in a more secure connection between the components of the assembly. It thus becomes apparent that it would be highly desirable to provide a cutting tap, as well as a method of cutting internal screw threads, that produces an internal screw thread with improved dimensional accuracy with respect to the shape and size of the threads.

As can also be appreciated, the speed of tapping affects the cost to produce an internal screw thread. What this means is that a manufacturing advantage can exist due to the use of a cutting tap that can produce internal screw threads at a higher rate or speed than has previously existed. It thus becomes apparent that it would be highly desirable to provide a cutting tap, as well as a method of cutting internal screw threads, that produces an internal screw thread at a higher speed than has heretofore been available.

The dominant material used to manufacture cutting taps is high-speed steel. High-speed steel exhibits good strength properties, which make it suitable for manufacture as a cutting tap in light of the geometric design thereof. Exemplary high-speed steels suitable for cutting taps include grades such as M1, M2 and M7. See ASTM Specification for Tool Steel High Speed.

In the context of other kinds of cutting tools (e.g., cutting tools used for chip forming material removal applications), cemented (cobalt) tungsten carbide is a preferred material for manufacturing such cutting tools over high-speed steel due to properties such as, for example, higher hardness and better high temperature stability including the ability to retain its hardness at high temperatures. Typically, cutting tools manufactured from cemented carbides (e.g., cobalt cemented tungsten carbide) can be used at cutting speeds that are at least three times higher than cutting tools manufactured from "high-speed" steel. In addition, the useful tool life of the cemented carbide cutting tool has been longer than the useful tool life of the high-speed steel cutting tool. It can thus be seen that in chip forming material removal applications, the use of cemented carbides provides meaningful advantages over using high-speed steels.

While cemented carbide has provided these advantages in the context of a chip forming material removal application, heretofore, cemented carbide has not been a preferred material from which to form a cutting tap. Since cemented carbide has a lower strength than high-speed steel, its use for cutting taps is limited because cutting taps are typically geometrically weaker than other cutting tools.

In light of the advantages that exist with using cemented carbide cutting tools in other cutting applications (e.g., chip forming material removal applications), it would be desirable to provide a cutting tap that can be made from cemented carbide. Such a cemented cutting tap would provide numerous advantages over existing high-speed steel cutting taps. In this regard, a cemented carbide cutting tap would result in an improvement of the dimensional accuracy with respect to the size and shape of the threads as compared to high speed steel cutting taps. A cemented carbide cutting tap would result in an increase in the useful tool life of the cutting tap as compared to high speed steel cutting taps. A cemented carbide cutting tap would increase the production speed for internal screw threads as compared to a high speed steel cutting tap.

SUMMARY OF THE INVENTION

In one form thereof, the invention is a cutting tap that comprises an elongate tap body that has an axial forward end, an axial rearward end and a central longitudinal axis. The elongate tap body has a fluted section at the axial forward end thereof wherein the fluted section presents a flute. The fluted section includes a chamfered fluted section beginning at and extending in an axial rearward direction from the axial forward end of the elongate body wherein the chamfered fluted section has an axial rearward termination. The chamfered fluted section comprises a plurality of cutting threads wherein each one of the cutting threads has a cutting face terminating at a distal cutting edge. The cutting face is disposed at a cutting face angle relative to a radial reference line between the distal cutting edge and the central longitudinal axis. The cutting face angle of the cutting threads in the chamfered fluted section becomes more negative the farther the cutting thread is away from the axial forward end of the chamfered fluted section.

In another form thereof, the invention is a cutting tap that comprises an elongate tap body that has an axial forward end, an axial rearward end and a central longitudinal axis. The elongate tap body has a fluted section at the axial forward end thereof wherein the fluted section presents a flute. The fluted section includes a chamfered fluted section beginning at and extending in an axial rearward direction from the axial forward end of the elongate body wherein the chamfered fluted section has an axial rearward termination. The fluted section further includes a finishing fluted section that has an axial forward end contiguous with the chamfered fluted section and an axial rearward termination. The finishing fluted section comprises a plurality of cutting threads wherein each one of the cutting threads has a cutting face terminating at a distal cutting edge. The cutting face is disposed at a finishing cutting face angle relative to a radial reference line between the distal cutting edge and the central longitudinal axis. The finishing cutting face angle of each one of the cutting threads in the finishing fluted section is essentially equal. The finishing cutting face angle is more negative than the cutting face angle for the cutting thread at the axial rearward termination of the chamfered fluted section.

In still another form thereof, the invention is a cutting tap that comprises an elongate tap body that has an axial forward end, an axial rearward end and a central longitudinal axis. The elongate tap body has a fluted section at the axial forward end thereof wherein the fluted section presents a flute. The fluted section includes a chamfered fluted section beginning at and extending in an axial rearward direction from the axial forward end of the elongate body wherein the chamfered fluted section has an axial rearward termination. The fluted section further includes a finishing fluted section beginning at and extending in an axial rearward direction from the junction with the chamfered fluted section. The chamfered fluted section comprises a plurality of cutting threads wherein each one of the cutting threads has a cutting face terminating at a distal cutting edge. The cutting face is disposed at a cutting face angle relative to a radial reference line between the distal cutting edge and the central longitudinal axis. The cutting face angle of the cutting threads in the chamfered fluted section becomes more negative the more axially rearward the cutting thread is from the axial forward end of the chamfered fluted section. The finishing fluted section comprises a plurality of cutting threads wherein each one of the cutting threads has a cutting face terminating at a distal cutting edge. The cutting face is disposed at a finishing cutting face angle relative to a radial reference line between the distal cutting edge and the central longitudinal axis. The finishing cutting face angle of each one of the cutting threads in the finishing fluted section is essentially equal. The finishing cutting face angle is more negative than the cutting face angle for the cutting thread at the axial rearward termination of the chamfered fluted section.

In another form thereof, the invention is a cutting tap that comprises an elongate tap body that has an axial forward end, an axial rearward end, a central longitudinal axis and a diameter. The elongate tap body has a fluted section at the axial forward end thereof wherein the fluted section presents a flute. The fluted section includes a chamfered fluted section beginning at and extending in an axial rearward direction from the axial forward end of the elongate body wherein the chamfered fluted section has an axial rearward termination. The chamfered fluted section comprises a plurality of cutting threads wherein each one of the cutting threads has a cutting face terminating at a distal cutting edge. The cutting face is defined by a transition radius that has a center point wherein the center point of the transition radius moves radial inward relative to the distal cutting edge as the cutting thread moves in the axial rearward direction. The transition radius ranges from between about five percent to about one hundred percent of the cutting tap diameter.

BRIEF DESCRIPTION OF THE DRAWINGS

The following is a brief description of the drawings that form a part of this patent application.

DETAILED DESCRIPTION

Figure 1:
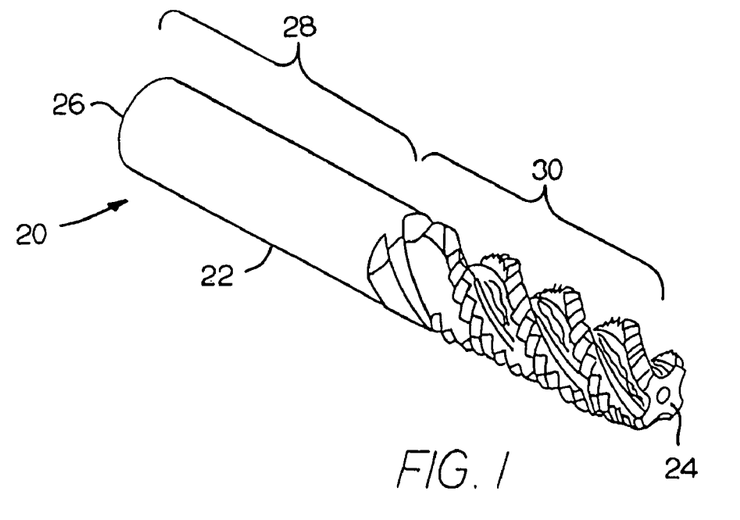
FIG. 1 is an isometric view of a specific embodiment of a spiral-fluted cutting tap of the invention.

Referring to the drawings, FIG. 1 illustrates a specific embodiment of the cutting tap of the invention generally designated as 20 wherein the cutting tap 20 has spiral flutes. Cutting tap 20 has an elongate body 22 with an axial forward end 24 and an axial rearward end 26. The cutting tap 20 has a cylindrical shank portion (bracket 28) adjacent to the axial rearward end 26 and a spiral-fluted portion (bracket 30) adjacent to the axial forward end 24.

The cutting tap 20 is operatively connected to a machine tool or the like at the cylindrical shank portion 28 thereof. The spiral-fluted portion 30 has a chamfered region beginning at and extending in an axial rearward direction from the axial forward end 24. The chamfered region joins a constant diameter (or finishing) region that extends in the axial rearward direction terminating at the juncture with the cylindrical shank portion 28.

In regard to specific tapping applications, spiral flute taps with a right hand helix pull the chips out of the hole (right hand thread) and are effective in blind holes. Left hand spiral fluted taps direct the chip ahead of the tap (right hand thread) and are effective in through holes.

The invention can be applied to taps with any number of flutes. For small diameter taps, three flutes are practical. For taps in the middle size range, four flutes are practical and large size taps may have five flutes. The range of sizes may overlap with regards to the number of flutes that are used since this characteristic depends on the application. In combination with the number of flutes, the flute helix angle of right hand spiral fluted taps is varied according to the application over a fairly broad range. When used to tap deep holes in very soft material, a 55 degree flute helix angle is effective. When used to tap shallower holes in harder material, a 15 degree flute helix angle can be used. For tapping steel, a helix angle between 35 and 55 degrees is optimum.

Figure 2:
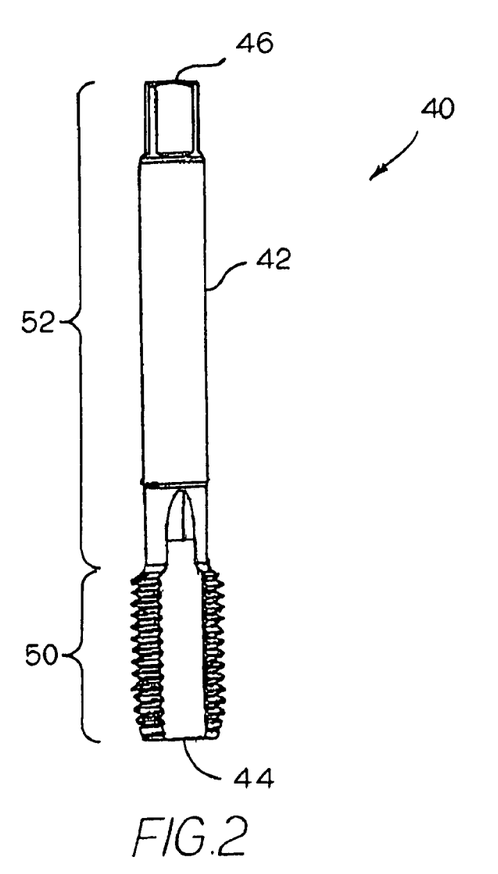
FIG. 2 is a side view of a specific embodiment of a straight-fluted cutting tap of the invention.

Referring to FIG. 2, there is shown another specific embodiment of a cutting tap of the invention, but this cutting tap is a straight-fluted cutting tap generally designated as 40. Straight-fluted cutting tap 40 has an elongate body 42 with an axial forward end 44 and an axial rearward end 46. The straight-fluted cutting tap 40 has a cylindrical shank portion (bracket 52) adjacent to the axial rearward end 46 and a straight-fluted portion (bracket 50) adjacent to the axial forward end 44. In reference to a specific application, taps with straight flutes are effective in materials such as cast iron that produce a short chip.

Each one of the spiral-fluted cutting tap 20 and the straight-fluted cutting tap 40 is made from cemented carbide. Exemplary cemented carbide materials include metal carbide(s) cemented with cobalt as the binder. Although the main carbide constituent generally is tungsten carbide, other carbides may be used such as tantalum carbide, titanium carbide and niobium carbide. In addition, small amount of transition metal carbides may be added to restrain grain growth, and the substrate may also contain small amount of inevitable impurities. In some cases, the binder may include iron and/or nickel along with the cobalt. One preferred cemented carbide is cobalt cemented tungsten carbide with a cobalt content equal to about 15 weight percent and the balance tungsten carbide and expected impurities.

It should be appreciated that although one focus of this description is upon the use of cemented carbide as the material for the cutting tap, applicants contemplate that the cutting tap geometry is applicable to other materials. In this regard, the geometry that makes it feasible to make a cutting tap out of cemented carbide can also be used in a high-speed steel cutting tap. The advantages connected with the geometry as used with a cemented carbide cutting tap would also exist for a high speed steel cutting tap.

Figure 6:
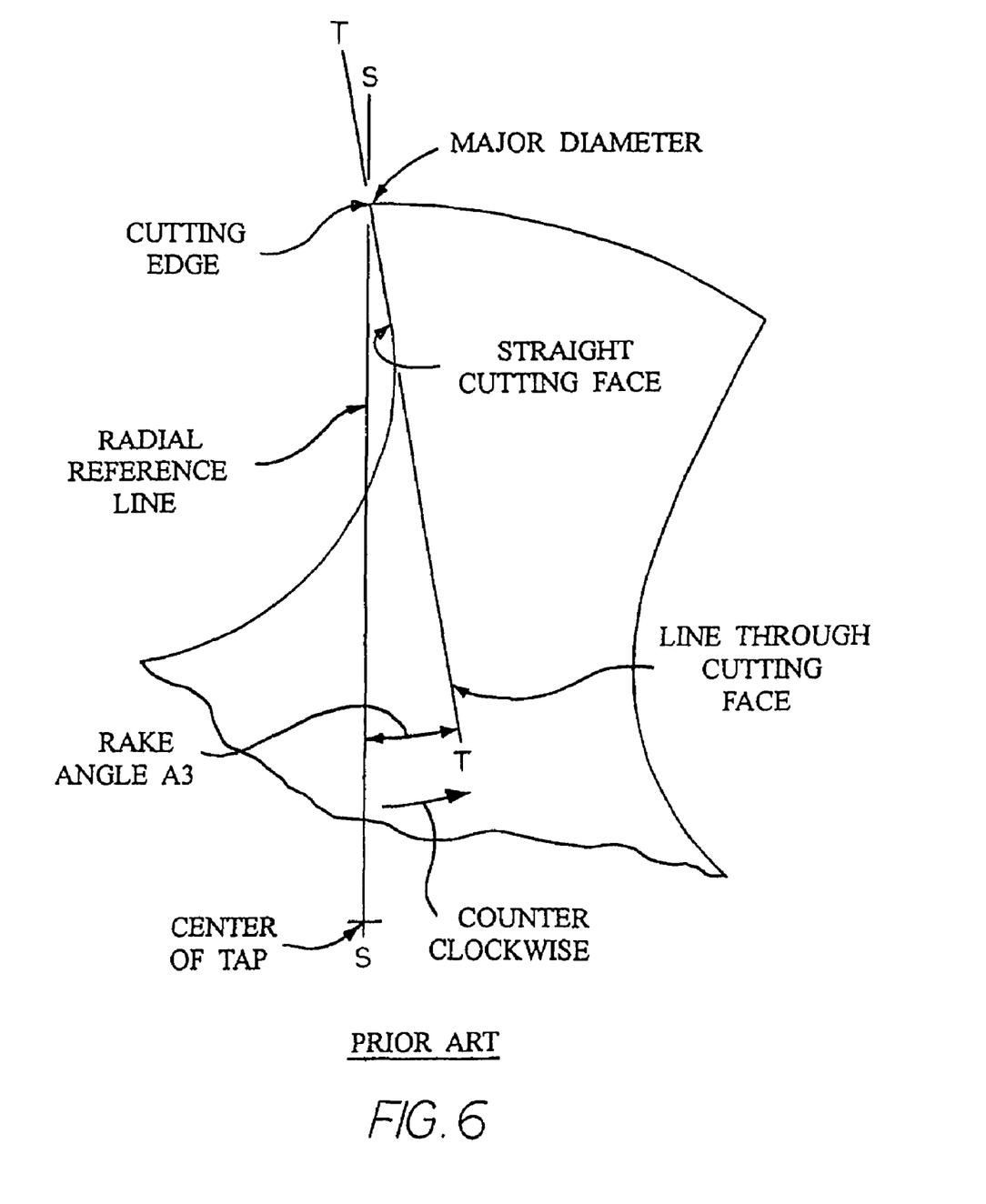
FIG. 6 is a cross-sectional view of one flute of a prior art cutting tap that has a straight cutting face.

Referring to FIG. 6, there is shown one flute of a four-fluted prior art cutting tap that has a straight cutting face. In this prior art cutting tap geometry, the straight cutting face is inclined relative to a radial reference line that travels from the cutting distal edge at the major diameter to the center of the cutting tap at a rake angle A3. In FIG. 6, the rake angle A3 is defined as the included angle between a line passing along the surface of the cutting face and the radial reference line. The rake angle A3 is positive when the inclination from the radial reference line is in the counterclockwise direction as viewed in FIG. 6. The rake angle is negative when the inclination from the radial reference line is in the clockwise direction as viewed in FIG. 6.

The magnitude of the rake angle A3 has an influence on edge strength of the prior art cutting tap. In this regard, one can increase the strength of the cutting edge by reducing the rake angle A3 (i.e., making the rake angle A3 more negative). However, while a reduction in the rake angle A3 will increase the strength of the cutting edge, the amount of cutting force necessary to tap (or cut) the threads increases with the reduction in the rake angle A3. When taps of the prior art are manufactured from cemented carbide, the cutting edges are very prone to chipping since carbide has low strength. Specifically, the cutting edges that are most prone to chipping are the narrow edges on the chamfer that approach and include the first full thread after the chamfer. The narrow full threads after the chamfer are also prone to chipping because they have a small included angle. The wider edges on the entry part of the chamfer are far less prone to chipping since they are not as narrow as the cutting edges of the full threads.

In applicants in-house laboratory experience with a cemented carbide cutting tap, rake angles (A3) equal to between 0 degrees to −5 degrees still result in chipping. Yet, it is not possible to reduce rake angle A3 of the prior art cemented carbide cutting taps beyond 0 to −5 degrees since more negative rake angles (A3) adversely affect the cutting action by increasing the cutting force necessary to tap the threads.

It should be appreciated that the above description of the obstacles connected with the rake angle (A3) of a cutting tap that has a straight cutting face also exist for a cutting tap that has an arcuate cutting face. In this regard, for a cutting tap that has an arcuate cutting face, a chordal hook angle corresponds to the rake angle (A3) for the cutting tap with the straight cutting face. The chordal hook angle is defined as the angle between a radial reference line between the major diameter to the center of the cutting tap and a chord between the distal cutting edge and the minor diameter of the cutting tap.

Figure 3:
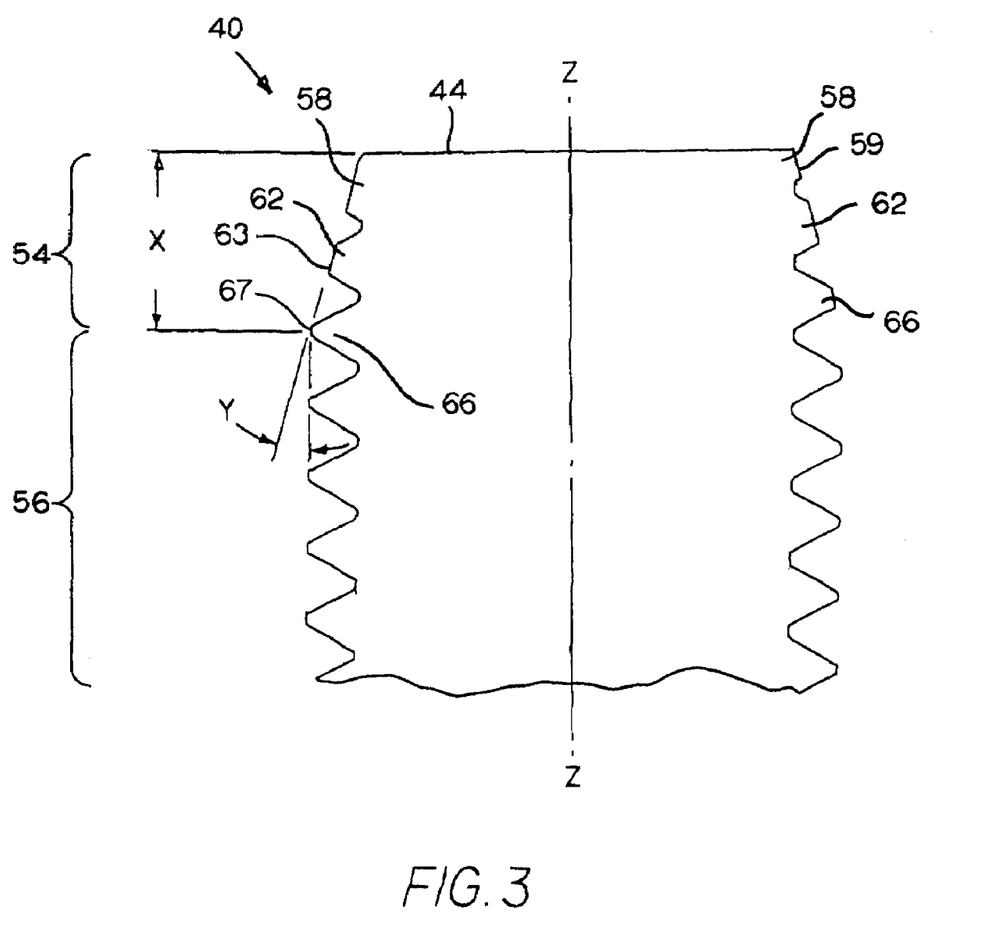
FIG. 3 is a side view showing the profile of the axial forward portion of the cutting tap of FIG. 2 including the chamfered section and the junction between the chamfered section and the constant diameter (or finishing) section of the cutting tap.

Referring to FIG. 3, there is shown the axial forward portion of the straight-fluted portion 50 of the straight-fluted cutting tap 40. It should be appreciated that the invention is also applicable to spiral-fluted cutting taps such as the cutting tap 20 of FIG. 1. There is a chamfered fluted section (bracket 54) beginning at and extending in an axial rearward direction from the axial forward end 44 of the cutting tap 40. Chamfered fluted section 54 extends for a pre-selected distance shown by the dimension "X" in FIG. 3. The chamfered fluted section 54 terminates at the junction with a constant diameter (or finishing) fluted section (bracket 56). The constant diameter fluted section 56 begins at the junction with the chamfered fluted section 54 and extends in an axial rearward direction until it terminates at the junction with cylindrical shank portion 52.

In reference to the chamfered fluted section 54, it is apparent that the peripheral surface of the chamfered fluted section 54 is disposed at an angle "Y" with respect to the central longitudinal axis Z-Z of the straight-fluted cutting tap 40. In other words, the peripheral surfaces of the threads in the chamfered fluted section lie along a frusto-conical surface that is disposed at angle "Y" from central longitudinal axis Z-Z.

The chamfered fluted section 54 has a series of V-shaped cutting threads where each cutting thread has a cutting edge. The distal cutting thread 58 has a cutting edge 59 and is the most axial forward cutting thread. Distal cutting thread 58 is adjacent to cutting thread 62, which has a cutting edge 63. Cutting thread 62 is adjacent to cutting thread 66, which has a cutting edge 67. Cutting thread 66 is adjacent to cutting thread 68, which has a cutting thread 69. It should be appreciated that the constant diameter (or finishing) fluted section 56 begins with cutting thread 66 and extends in the axial rearward direction therefrom until its junction with the cylindrical shank portion 52.

Figure 4:
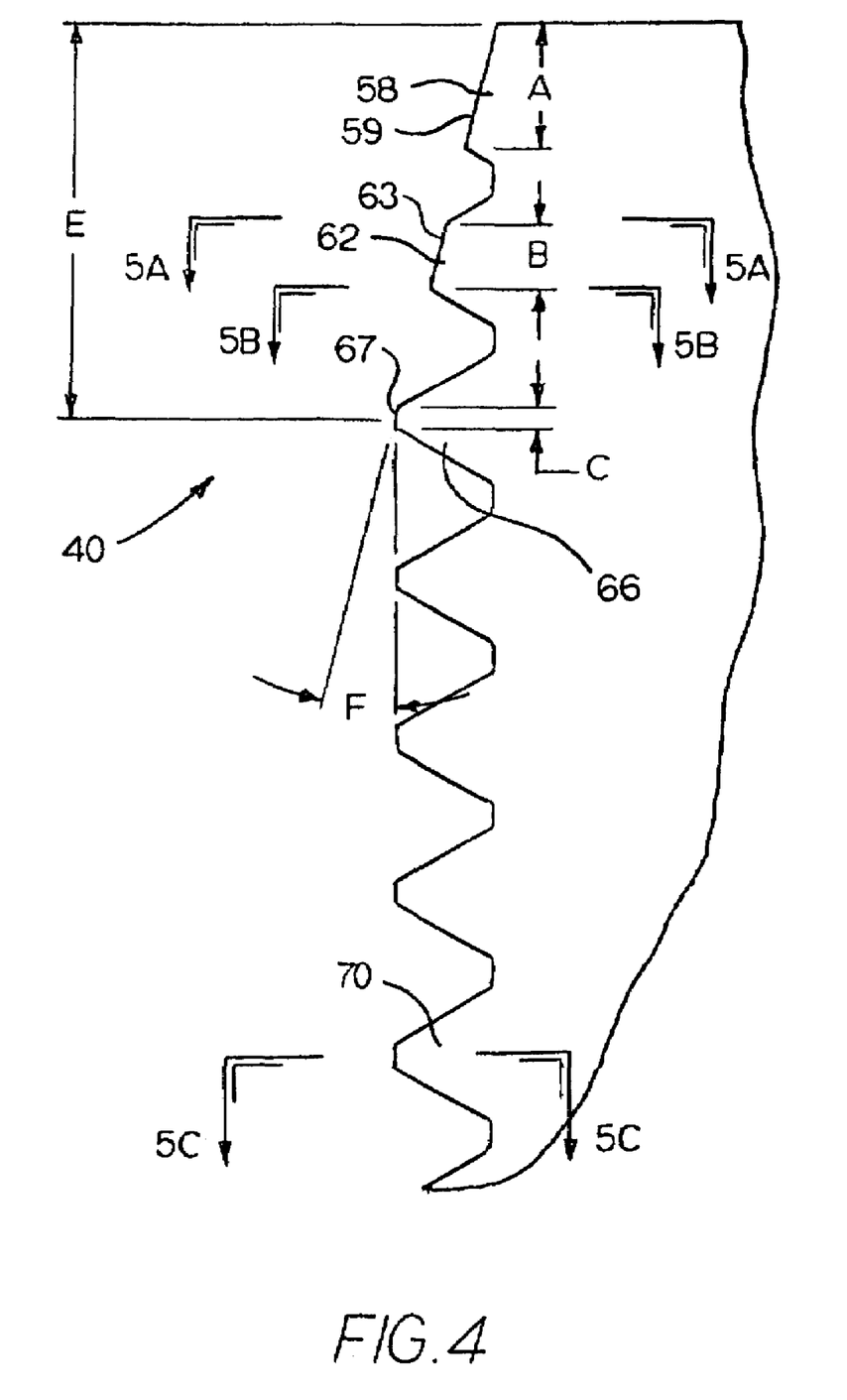
FIG. 4 is an enlarged view of the left side (as viewed in FIG. 3) of the side view of FIG. 3.

Referring to FIG. 4, the chamfered cutting edge 59 of the distal cutting thread 58 is the strongest of the cutting threads since it is wider than, and not as narrow as, the cutting edges of the other cutting threads (e.g., cutting edges 63 and 67 of cutting threads 62 and 66, respectively). In this regard, the distal cutting thread 58 has a width equal to "A". Thread 62 has a width equal to "B". Cutting thread 66 has a width equal to "C".

Although the positive rake cutting angle does not provide as much strength as a more negative angle, it makes the tapping or cutting action easier (i.e., requires less force). This means that since distal cutting thread 58 is the strongest cutting thread, the rake cutting angle can be positive to provide easier tapping with the cutting thread still having sufficient strength. In other words, distal cutting thread 58 presents a geometry that balances the strength and cutting ease to provide for an optimum tapping operation.

Still referring to FIG. 4, the next cutting thread 62 is not as strong as the distal cutting thread 58 since it is narrower. While the cutting angle may not be as positive as for distal cutting thread 58, it may still be positive or at least neutral (i.e., equal to zero degrees). Like for the distal cutting thread 58, the cutting thread 62 has a cutting face that balances the strength of the cutting thread and the ease of tapping to optimize the tapping operation.

The next cutting thread 66 is still not as strong as the distal cutting thread 58 or the cutting thread 62 since it is even more narrow. Here, the cutting angle may need to be negative to compensate for the lower strength of the cutting thread 66 even though it reduces the cutting ease. Like for the previously described cutting threads, the cutting thread 66 has a cutting face geometry that balances the strength of the cutting thread and the ease of tapping to optimize the overall tapping operation. The balance of the cutting threads are in the constant diameter (or finishing) fluted section and present essentially the same geometry.

Figure 5A:
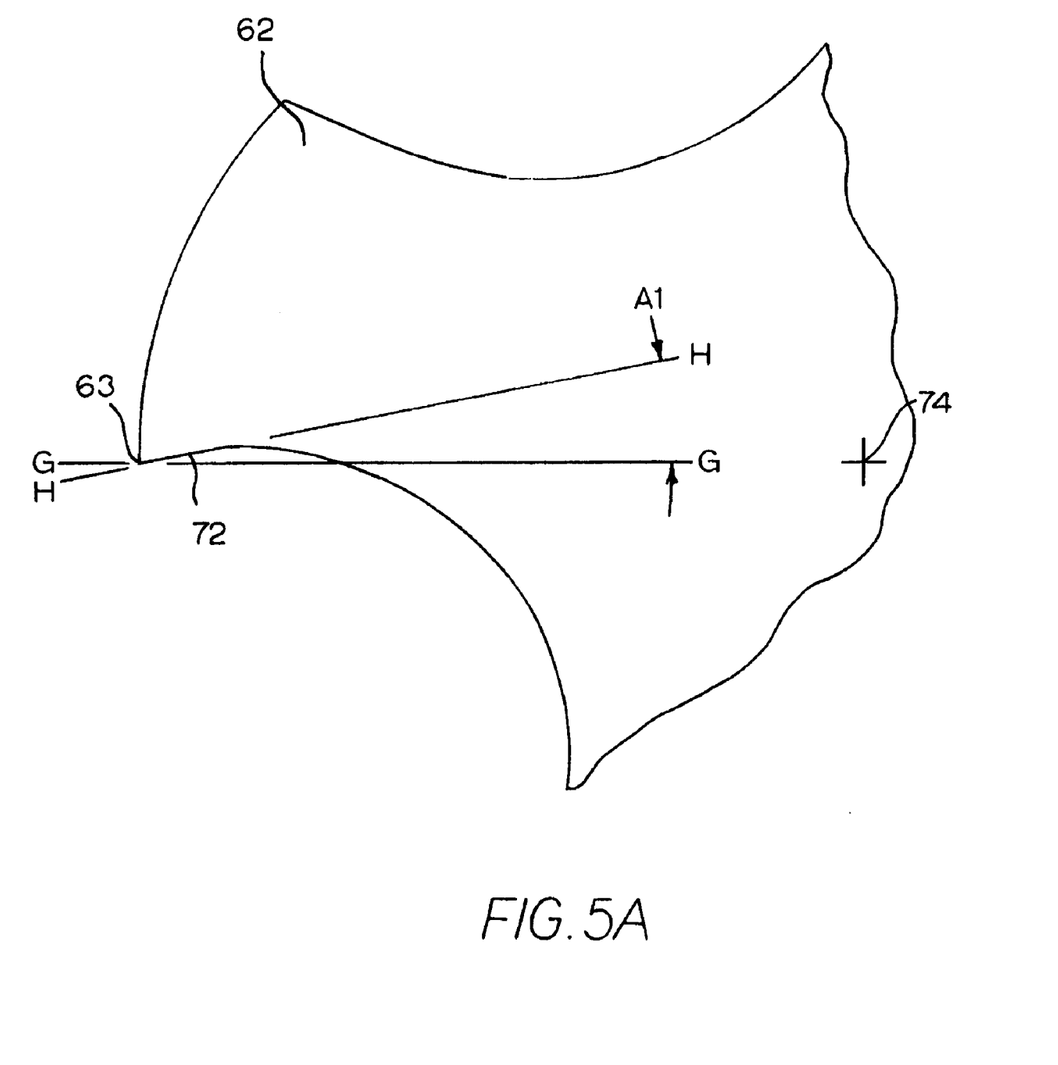
FIG. 5A is a cross-sectional view of the upper flute taken along section line 5A-5A in FIG. 4.

FIG. 5A illustrates the cutting face for a cutting thread 62 in the axial forward portion of the chamfered portion 54. Here, the cutting face 72 is straight and has an orientation to present a positive cutting angle A1. Cutting angle A1 is the included angle between the radial reference line G-G (i.e., the line passing through distal cutting edge 63 and the center 74 of the cutting tap) and a line H-H that lies along the cutting face 72. The cutting angle A1 is positive since the direction of inclination of line H-H relative to line G-G is in the counterclockwise direction as viewed in FIG. 5A. Since the cutting edges are stronger in the axial forward section of the chamfered portion 54, they can utilize a positive cutting angle, which allows for an easier cutting action.

Figure 5B:
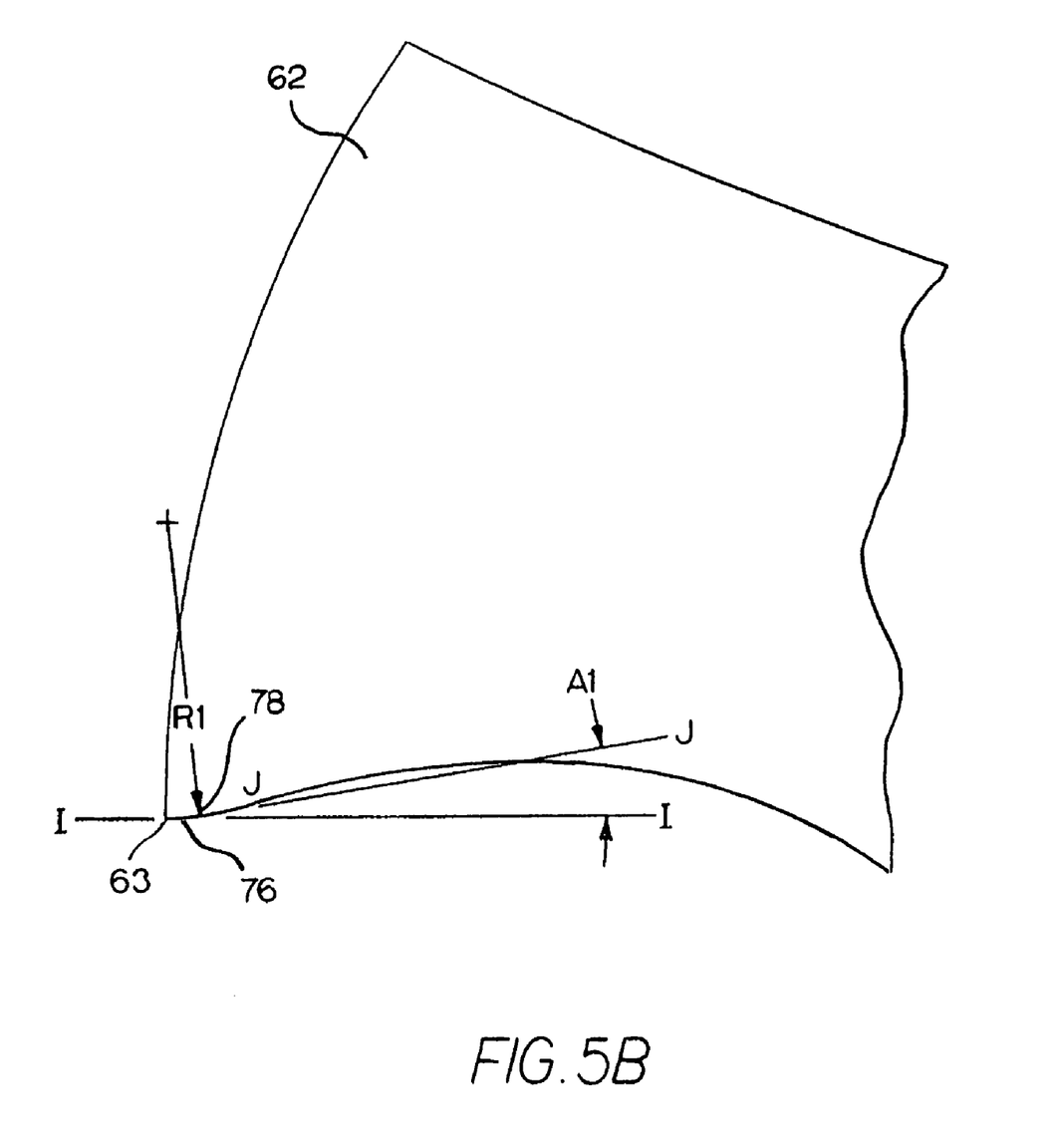
FIG. 5B is a cross-sectional view of the upper flute taken along section line 5B-5B in FIG. 4.

FIG. 5B illustrates the cutting face at a location in a more axial rearward part of the same cutting thread 62 as shown by the cross-section 5B-5B in FIG. 4. In FIG. 5B, the cutting face 76 presents a convex-shape as defined by transition radius R1. The length of transition radius R1 can vary between about five percent to about one hundred percent of the diameter of the cutting tap. The cutting angle is the included angle between the radius reference line and a line (I-I) tangent to the cutting face at the distal cutting edge 63, i.e., the axial forward termination of the convex cutting face 76. Here, the cutting angle is zero degrees, and hence, only line I-I is referenced because line I-I is coextensive with the radial reference line. The convex cutting face 76 also has an axial rearward termination 78. Line J-J is a line that is tangent to the convex cutting face 76 at the axial rearward termination 76. Angle A1 is the included angle between line I-I and line J-J. In this embodiment, angle A1 is equal to the cutting angle A1 as shown in FIG. 5A.

Even though the cutting angle is equal to zero degrees, it should be appreciated that other cutting angles are suitable depending upon the specific application for the cutting tap. The location and magnitude of the radius (R1) determines the orientation of the convex-shaped cutting face 76 and the magnitude of the cutting angle as defined by the included angle between the radius reference line and a line tangent to the cutting face at the distal cutting edge 63.

Figure 5C:
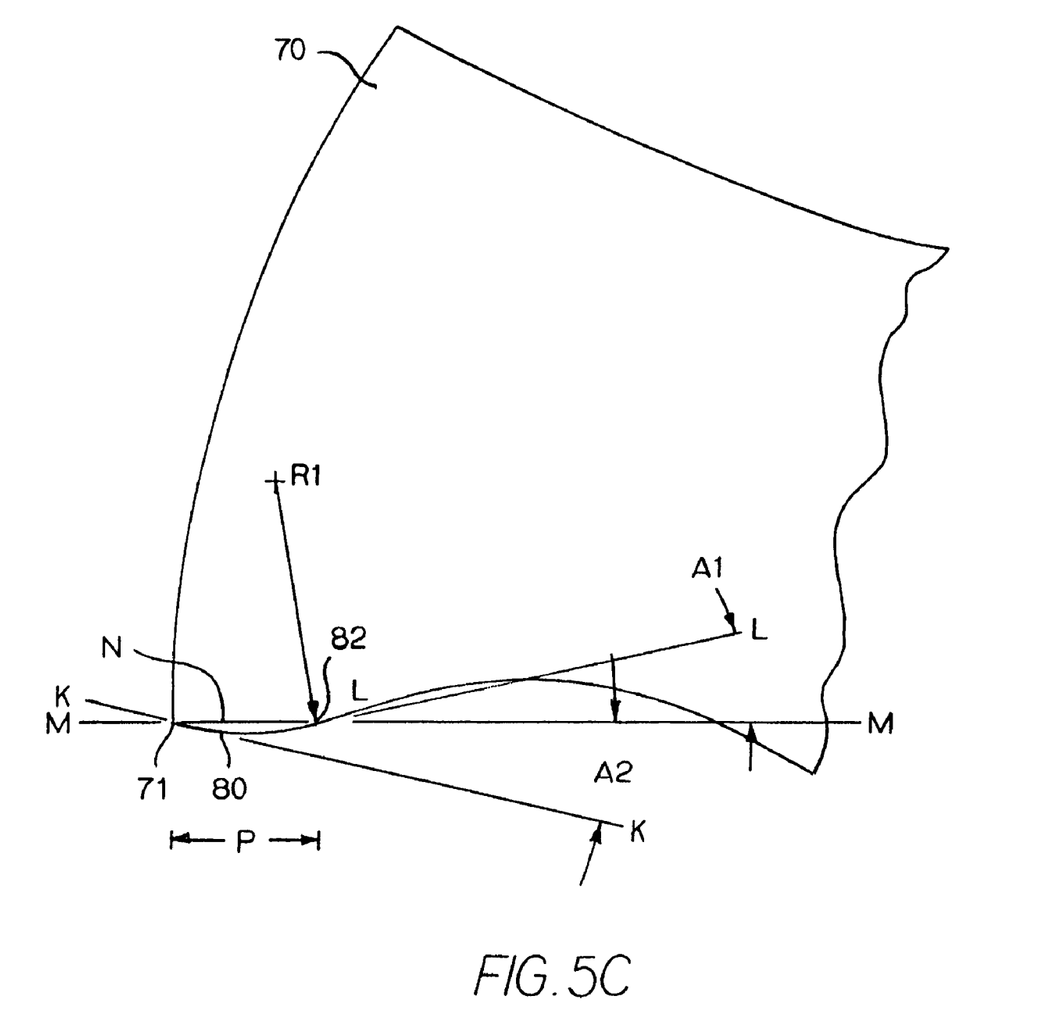
FIG. 5C is a cross-sectional view of the upper flute taken along section line 5C-5C in FIG. 4.

In constant diameter or finishing section of the chamfer and for threads past the chamfer such as, for example, the threads 70 shown by FIG. 5C, the edges of the chamfer or full threads are weaker and prone to chipping. The cutting angle A2 is reduced because the threads 70 are weaker than the more axial rearward threads. Referring to thread 70, there is a convex-shaped cutting face 80 that defines a cutting angle A2, which is the included angle between the radial reference line (M-M) and a line (K-K) tangent to the cutting face at the distal cutting edge 71. The cutting angle A2 is negative since the inclination of line K-K relative to line M-M is in the clockwise direction as viewed in FIG. 5C. It should be appreciated that the negative cutting angle compensates for the weaker thread 70 to optimize the overall tapping operation of the cutting tap.

The convex cutting face 80 also has an axial rearward termination 82. Line L-L is a line that is tangent to the convex cutting face 80 at the axial rearward termination 82. Angle A1 is the included angle between line L-L and line M-M. In this embodiment, angle A1 is equal to the cutting angle A1 as shown in FIG. 5A.

The movement of the center point of the transition radius R1 relative to the distal cutting edge allows a smooth transition from the positive cutting angle A1 in the axial forward section of the chamfered portion 54 to negative cutting angle A2. The geometry of the cutting face as defined by the radial inward progressive movement of the center point of the constant radius (R1) relative to the distal cutting edge results in cutting angles that are in between positive cutting angle A1 and negative cutting angle A2. Therefore, the cutting face geometry of the inventive cutting tap is optimized to allow effective cutting angles where needed on the forward entry part of the chamfer, and chip resistant cutting edges on later finishing portions of the chamfer and threads axial rearward of the chamfer. In regard to the cutting action of the cutting tap 40, the cutting tap 40 generates an internal screw thread form by a succession of cutting edges on the chamfered section of the tap. Material is removed from the wall of the hole until the final thread form is obtained with the first full thread on the constant diameter fluted section.

In regard to ranges of the cutting angles, applicants contemplate that cutting taps made from cemented carbide can be effectively used when angle A1 is within the range 5 degrees negative to 15 degrees positive and the angle A2 is within the range 0 to 25 degrees negative. The size of the radius R1 controls the transition from cutting angle A1 to cutting angle A2 by forming a chord between A1 and A2 that ranges in width from 0 to 80 percent of the thread height. An exemplary chord N of a length P is shown in FIG. 5C.

It should be appreciated that the balance of the cutting tap flute leading to the inventive tap cutting face can take any shape used in current practice as long as the radius of the flute is tangent to the line defined by angle A1.

Another option is to form the tap such that this profile remains constant along both the chamfer and the body of the tap past the chamfer. In this case, the cutting face angle at the cutting edges will be A2 along the entire length. As the chip is formed starting at the cutting edge and flows across the cutting face, it will be first opposed by a low cutting angle A2 that transitions through radius R1 to a higher cutting angle A1.

In regard to the manufacture of the cutting tap, the cutting tap is manufactured from a cylindrical sintered tungsten carbide blank, frequently referred to as a substrate. The blank has a diameter that is sized larger than the finished dimensions of the tap and is cut to length.

The first step in processing the substrate is to grind the blank to precision cylindrical tolerances by methods such as cylindrical traverse grinding on centers or by centerless infeed grinding methods. During this step, a cylindrical shank is ground to size at the axially rearward end of the tap and the major diameter of a threaded body portion is formed at the axially forward end of the tap. Additionally during this process, or as a consequence of an additional process, an optional neck portion may be created with a cylindrical surface, and a bevel between the cylindrical shank and the neck portion. Additionally, an optional bevel may be ground on the ends of the taps by cylindrical grinding. In general, the shank diameter is approximately equal to the nominal thread diameter, but the shank diameter may be smaller than the nominal thread diameter for large diameter taps, and alternatively larger for small diameter taps. An option may be the grinding of a square as part of the shank at the extreme axially rearward end of the tap as shown in FIG. 2.

In the next step, one or more flutes are ground so as to provide cutting edges, in combination with the chamfer. The shape of the grinding wheel is formed so as to provide a cutting face with the selected cutting angles A1 and A2, with A1 and A2 tangent to radius R1, where A1 is more positive than A2. The balance of the flute may be shaped according to current art as long as A1 is tangent to a radius leading to the balance of the flute. The complete form may be ground in one or two steps. For example, the flute may be ground in two steps by first grinding the flute according to current art and then grinding the invented cutting face in a following operation. Alternatively, the wheel may be shaped so as to generate the complete form in one operation. The flutes may be straight or helical, either right or left hand in any combination with either right or left hand threads.

In the next step, the threaded body portion is ground to from V-shaped thread flank surfaces, along with minor and major diameters, on the helix. Subsequently, the shape of a threaded cutting chamfer portion is formed by grinding. The V-shaped thread flank surfaces and major diameter replicate the internal screw thread that is generated during tapping.

The cutting chamfer portion is ground with a taper so as to allow entry in the hole to be tapped. After the chamfer is ground, the effective cutting edge angle is A1 with the first entry portion of the chamfer and gradually progresses to cutting angle A2 in later finishing portions of the chamfer.

Alternatively, it is possible to shape the grinding wheel so as to provide a cutting face with the selected cutting angles A1 and A2, with cutting angles A1 and A2 tangent to radius R1 where cutting angle A1 is more positive than cutting angle A2; and after grinding the chamfer, the cutting face is ground first with this wheel at the chamfer angle and then along the flute in body of the tap after the chamfer, such that this profile remains constant along the entire length of the chamfer and tap body.

After grinding, the tap may be honed with abrasive media or abrasive brushes so as to form a small radius on the cutting edges and other sharp corners. The resulting radius may be between about 0 microns and about 100 microns. This honing further increases the strength of these edges.

As a final step in the process, the tap may be optionally coated with a wear resistant layer (not shown) of metal nitrides, carbides, carbonitride, borides and/or oxides, wherein the metal is chosen from one or more of the following: aluminum, silicon and the transition metals from Groups IVa, Va and VIa of the Periodic Chart. This layer is deposited as a single monolayer or in multiple, including alternating layers. Low friction layers can also be deposited on top of these wear resistant layers.

As can be appreciated, the present invention provides a cutting tap that allows for the use of a cemented carbide cutting tap that is not prone to chipping. The use of a cemented carbide cutting tap possess a number of advantages.

In regard to the advantages a cemented carbide cutting tap has over existing high-speed steel cutting taps, a cemented carbide cutting tap would result in an improvement of the dimensional accuracy with respect to the size and shape of the threads as compared to high speed steel cutting taps. Furthermore, a cemented carbide cutting tap would result in an increase in the useful tool life of the cutting tap as compared to high speed steel cutting taps. In addition, a cemented carbide cutting tap would increase the production speed for internal screw threads as compared to a high speed steel cutting tap.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A cutting tap comprising:
   an elongate tap body having an axial forward end, an axial rearward end, a central longitudinal axis and a diameter, the elongate tap body having a fluted section at the axial forward end thereof wherein the fluted section presents a flute;
   the fluted section including a chamfered fluted section beginning at and extending in an axial rearward direction from the axial forward end of the elongate body wherein the chamfered fluted section has an axial rearward termination; and
   the chamfered fluted section comprising a plurality of cutting threads wherein each one of the cutting threads having a cutting face terminating at a distal cutting edge, and the cutting face being defined by a transition radius having a center point and the center point of the transition radius moving radial inward relative to the distal cutting edge as the cutting thread moves in the axial rearward direction, and the transition radius ranging from between about five percent to about one hundred percent of the cutting tap diameter.

2. The cutting tap according to claim 1 wherein the chamfered fluted section having an axial forwardmost cutting thread wherein the cutting face angle ranges between about 5 degrees negative to about 15 degrees positive, and the chamfered fluted section having an axial rearwardmost cutting thread wherein the cutting face angle ranges between about 1 degree negative to about 25 degrees negative.

3. The cutting tap according to claim 1 wherein the elongate tap body is made from cemented carbide.

4. The cutting tap according to claim 1 wherein the fluted section presents a straight flute.

5. The cutting tap according to claim 1 wherein the fluted section presents a spiral flute having a helix angle between about 15 degrees and about 55 degrees.

6. The cutting tap according to claim 1 wherein the cutting edges being honed.

7. The cutting tap according to claim 1 further comprising a coating scheme, and the coating scheme including one or more layers of metal nitrides, carbides, carbonitrides, borides and/or oxides, wherein the metal is chosen from one or more of the following: aluminum, silicon and the transition metals from Groups IVa, Va, and VIa of the Periodic Chart.

8. The cutting tap according to claim 7 further including a friction reducing layer on the coating scheme.

9. The cutting tap according to claim 1 wherein the elongate tap body comprises high-speed steel.

10. The cutting tap according to claim 1 wherein the fluted section further including a finishing fluted section having an axial forward end contiguous with the chamfered fluted section and an axial rearward termination;
    the finishing fluted section comprising a plurality of cutting threads wherein each one of the cutting threads having a cutting face terminating at a distal cutting edge, and the cutting face being disposed at a finishing cutting face angle relative to a radial reference line between the distal cutting edge and the central longitudinal axis; and
    the finishing cutting face angle of each one of the cutting threads in the finishing fluted section being essentially equal, and the finishing cutting face angle being more negative than the cutting face angle for the cutting thread at the axial rearward termination of the chamfered fluted section.

11. The cutting tap according to claim 10 wherein the finishing face angle ranges between about 1 degree negative to about 25 degrees negative.

12. The cutting tap according to claim 1 wherein the cutting face being disposed at a cutting face angle relative to a radial reference line between the distal cutting edge and the central longitudinal axis; and the cutting face angle of the cutting threads in the chamfered fluted section becoming more negative the farther the cutting thread is away from the axial forward end of the chamfered fluted section.

* * * * *